(12) United States Patent
McIlroy

(10) Patent No.: US 9,251,113 B1
(45) Date of Patent: Feb. 2, 2016

(54) SYSTEM FOR ENABLING PARTICIPANTS TO DISCUSS, DEBATE, CONNECT AND COMPARE MEDIA AND INFORMATION

(71) Applicant: Resolve Group Corp., Los Gatos, CA (US)

(72) Inventor: Adrik Robert McIlroy, Los Gatos, CA (US)

( * ) Notice: Subject to any disclaimer, the term of this patent is extended or adjusted under 35 U.S.C. 154(b) by 296 days.

(21) Appl. No.: 14/020,214

(22) Filed: Sep. 6, 2013

Related U.S. Application Data

(60) Provisional application No. 61/697,312, filed on Sep. 6, 2012.

(51) Int. Cl.
G06F 15/16 (2006.01)
G06F 15/173 (2006.01)
G06Q 50/00 (2012.01)

(52) U.S. Cl.
CPC .......... *G06F 15/17306* (2013.01); *G06Q 50/01* (2013.01)

(58) Field of Classification Search
CPC ........................ G06F 15/17306; G06Q 50/01
See application file for complete search history.

(56) References Cited

U.S. PATENT DOCUMENTS

| 2012/0124483 A1* | 5/2012 | Zuckerberg | H04L 51/36 715/752 |
|---|---|---|---|
| 2012/0143972 A1* | 6/2012 | Malik | H04L 51/36 709/206 |
| 2013/0018957 A1* | 1/2013 | Parnaby | G06Q 10/10 709/204 |
| 2014/0012927 A1* | 1/2014 | Gertzfield | G06Q 50/01 709/206 |
| 2014/0019539 A1* | 1/2014 | Novak | G06Q 50/01 709/204 |

* cited by examiner

*Primary Examiner* — Moustafa M Meky
(74) *Attorney, Agent, or Firm* — David H. Judson

(57) ABSTRACT

A system that enables participating users to discuss, debate, connect and compare media and information online. Preferably, the system operates as an on-demand hosted platform that provides a secure architecture on which users can interact with one another, e.g., to build consensus with respect to a given topic, a piece of content, or the like. Participating users interact with a conversation graph, which is preferably represented in a multi-column format. The graph comprises individual "stances" and "bridges" that connect the stances. End users interact with the graph by voting on a stance, entering new stances, and bridges. As users interact, a system-defined currency value unit (referred to as "kudos") is associated with a vote, and these units accumulate across stances and bridges in the graph. A kudos propagation scheme is enforced to provide additional information to the users about which stances or bridges have particular information value in the conversation.

17 Claims, 15 Drawing Sheets

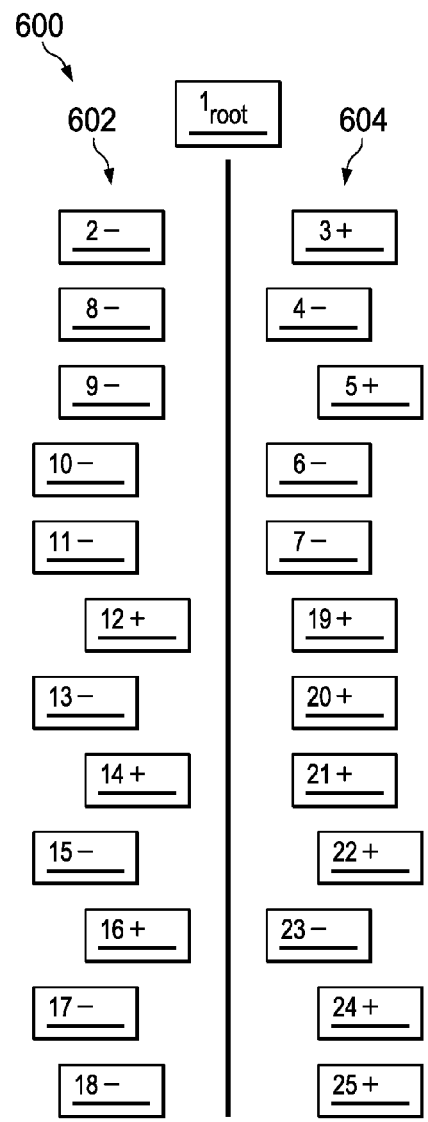
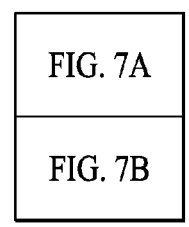
FIG. 6
FIG. 7

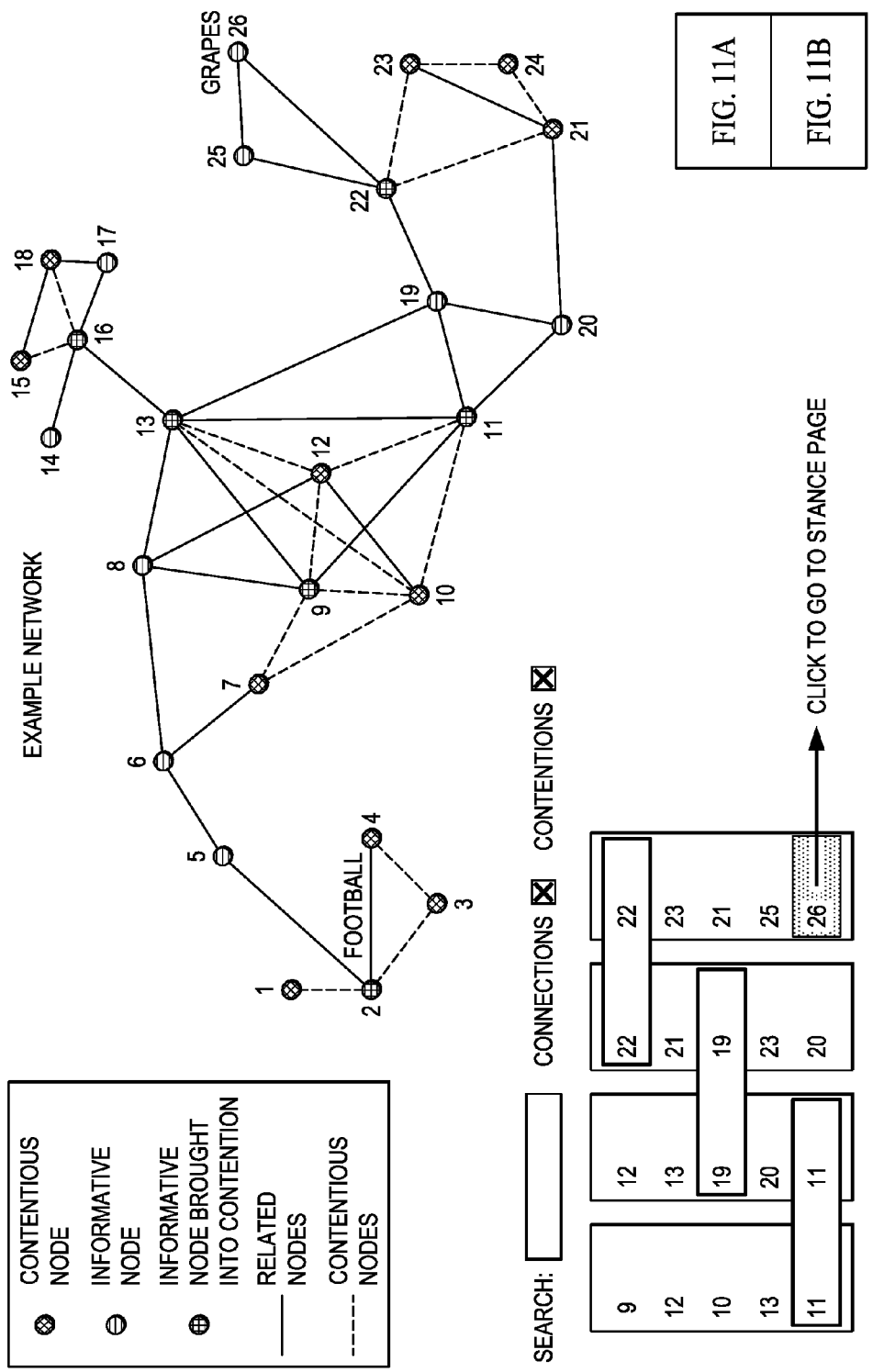

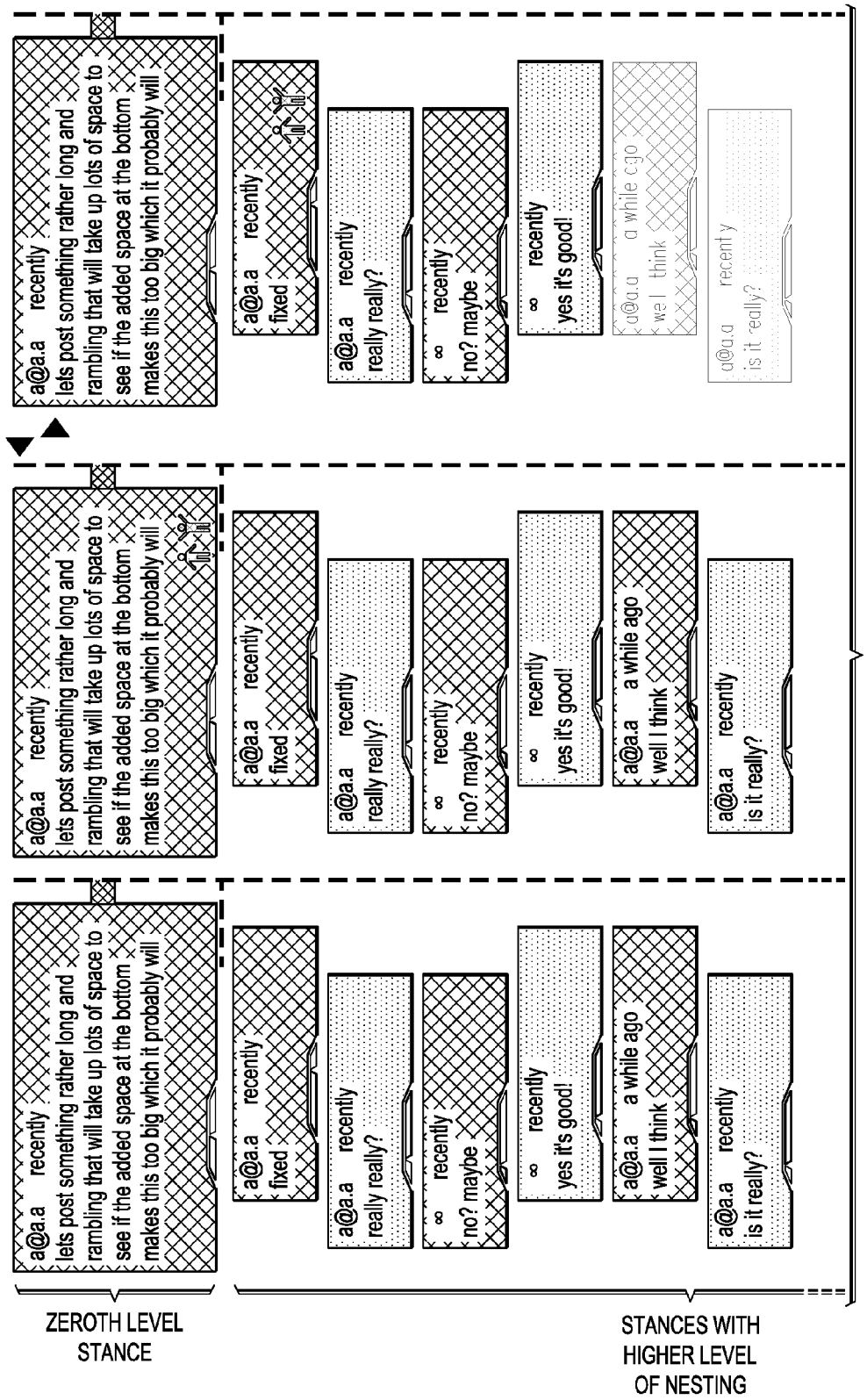

SYSTEM FOR ENABLING PARTICIPANTS TO DISCUSS, DEBATE, CONNECT AND COMPARE MEDIA AND INFORMATION

BACKGROUND

1. Technical Field

This disclosure relates generally to technologies to enable group discussion and consensus building among participants in an online environment.

2. Background of the Related Art

Web-based participation technologies for enabling online discussion forums are well-known. These include, without limitation, Web 2.0-based content such as blogs, wikis, social networks, online voting, and the like. Users who participate in online discussions of this type can publish content, provide comments, respond to other user comments, initiate new conversational threads, vote on what they like or dislike, and the like. While these approaches provide useful forums for enabling online content publication and discussion, they generate large amounts of unstructured interactions that are often difficult for participants to follow. As a consequence, these types of forums have not proven useful in certain circumstances, e.g., to facilitate consensus building with respect to given content under discussion. For example, in a typical discussion thread, one user may comment on a point made by a prior user that takes the discussion into an unrelated or irrelevant issue. Once this occurs, other participants may then be unable to return the thread back to a main discussion point or to respond to earlier posts of interest. As a result, the forum may quickly disintegrate into relatively useless and unstructured discussion among the more "vocal" participants while the overall information quality and utility deteriorates.

BRIEF SUMMARY

The subject matter herein relates generally to a system that enables participating users to discuss, debate, connect and compare media and information online. Preferably, the system operates as an on-demand hosted platform (software-as-a-service (SaaS)) that provides a secure architecture on which users can interact with one another, e.g., to build consensus with respect to a given topic, a piece of content, or the like.

Participating users interact with a conversation graph, which is preferably represented in a multi-column format. The graph comprises individual "stances" and "bridges" that connect the stances. End users interact with the graph by voting on a stance, entering new stances, and bridges. As users interact, a system-defined currency value unit (referred to as "kudos") is associated with a vote, and these units accumulate across stances and bridges in the graph. A kudos propagation scheme is enforced to provide additional information to the users about which stances or bridges have particular information value in the conversation.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which:

FIG. 6 illustrates the column display in FIG. 5 in a compressed column format;

FIG. 10 illustrates navigation by list display mode;

FIGS. 11A and 11B illustrate a thread highlighting function;

DETAILED DESCRIPTION OF AN ILLUSTRATIVE EMBODIMENT

The disclosed method may be practiced in association with a computing infrastructure comprising one or more data processing machines.

Enabling Technologies

A representative infrastructure is a service that provides an interactive online forum.

Figure 1:
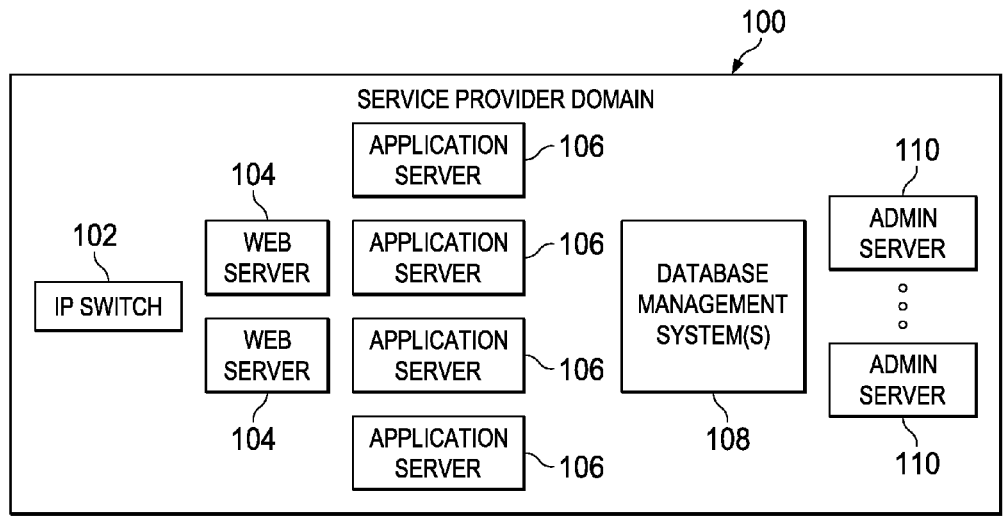
FIG. 1 is a simplified block diagram of a system architecture in which the hosted platform may be implemented according to one embodiment.

This type of service (in whole or in part) may be implemented on or in association with a service provider infrastructure 100 such as seen in FIG. 1. A representative infrastructure of this type comprises an IP switch 102, a set of one or more web server machines 104, a set of one more application server machines 106, a database management system 108, and a set of one or more administration server machines 110. Without meant to be limiting, a representative technology platform that implements the service comprises machines, systems, sub-systems, applications, databases, interfaces and other computing and telecommunications resources. A representative web server machine comprises commodity hardware (e.g., Intel-based), an operating system such as Linux, and a web server such as Apache 2.x (or higher). A representative application server machine comprises commodity hardware, Linux, and an application server such as WebLogic 9.2 (or later). The database management system may be implemented as an Oracle (or equivalent) database management package running on Linux. The infrastructure may include a name service, FTP servers, administrative servers, data collection services, management and reporting servers, other backend servers, load balancing appliances, other switches, and the like. Each machine typically comprises sufficient disk and memory, as well as input and output devices. The software environment on each machine includes a Java virtual machine (JVM) if control programs are written in Java. Generally, the web servers handle incoming business entity provisioning requests, and they export a management interface. The application servers manage the basic functions of the service including, without limitation, business logic.

One or more functions of such a technology platform may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

The front-end of the above-described infrastructure is also representative of a conventional third party web site.

Client devices access service provider infrastructure as described to retrieve content, including HTML, media players, video content, and other objects. A typical client device is a personal computer, laptop, mobile device, tablet, or the like. A representative mobile device is an Apple iPad® or iPad2, iPad Mini, an Android™-based smartphone or tablet, a Windows®-based smartphone or tablet, or the like. A device of this type typically comprises a CPU (central processing unit), such as any Intel- or AMD-based chip, computer memory 304, such as RAM, and a flash drive. The device software includes an operating system (e.g., Apple iOS, Google® Android™, or the like), and generic support applications and utilities. The device may also include a graphics processing unit (GPU), and a touch-sensing device or interface configured to receive input from a user's touch. The touch-sensing device typically is a touch screen. The mobile device comprises suitable programming to facilitate gesture-based control, in a manner that is known in the art.

The client is not limited to a mobile device, as it may be a conventional desktop, laptop or other Internet-accessible machine running a web browser. Content retrieved to the client may be rendered in a browser, within a mobile app, or other rendering engine.

As will be described below, the system herein may be implemented as on-demand social media platform that combines a full range of so-called Web 2.0 technologies (e.g., blogs, wikis, discussion groups, social networking, podcasts, RSS, tagging, photos, videos, mapping, and the like) with content moderation. End users preferably interact with the platform as a hosted service, although in an alternative embodiment the system may be implemented over a private network, or as a product (as opposed to a hosted or managed service).

The services provided by the hosted platform may also be exposed on one or more publicly-accessible web sites. Thus, for example, a third party (e.g., a content publisher) associated with the service may provide a publicly-accessible web site in the usual manner and include one or more Web 2.0 technologies (e.g., blogs, wikis, discussion groups, social networks, podcasts, RSS feeds, etc.) using the techniques described herein. Those technologies may be exposed as separate pages within the larger site, or they may be located within a given page or pages.

GLOSSARY

As used herein, the following terms have the following definitions:

A "data object" is an object in an interpreted programming language on the system. Preferably, a data object is stored persistently on or in association with the system, and the system is able to retrieve, modify, and send it elsewhere in the system. By implementing the stance as a data object, the system is able to achieve all the requirements in handling portions of information as described herein. One could implement a data object in any other way that allows the stance (as defined below) to be manipulated as a distinct entity by the system and contain within it a portion of information.

A "stance" is a data object that forms a container for a portion of information (known as "prime-information") in the system, and information about that information (known as "meta-information"). The "prime-information" contained in a stance can be any information able to be represented by the system. This information includes, without limitation, text, images, video, audio, tactile data, URLs, hyperlinks, data, programs, other sensory data or information, files, network information, and combinations thereof. The information may be placed in a stance by one or more users or by processes in the system. The "meta-information" contained in a stance can be any information able to be represented by the system. The meta-information is information about the prime-information in the stance. This information includes, but is not limited to, addresses between this stance and other stances; "kudos" (as defined below) assigned to the stance; how, where, why, by whom, and when the prime-information originated; how, where, why, by whom, and when the prime-information became part of the system; how and why this prime-information relates to other prime-information in the system.

A "bridge" is a "data object" (as defined above) that contains information that connects together two or more stances. A bridge is a measuring station that collects data about how users behave with those connected stances. A bridge typically is unidirectional, but a bridge may also be implemented bi-directionally or n-directionally. Preferably, a bridge is used by the system to handle, support, and analyze a connection between two or more stances. A bridge's function within the system is differentiated by the bridge's 'type' so that a bridge in the abstract form can be applied to many different connection-based tasks. The information stored in a bridge includes, without limitation, addresses between stances; kudos assigned to the bridge: how, where, why, by whom, and when the bridge originated; what behavior users exhibited when following this bridge between stances such as how long they looked at the data for, what changes they made there, what voting with kudos they performed, where they came from, and where they went to after; and how and why this information relates to other bridges and stances in the system.

A bridge has a degree of strength referred to as "bridge strength." Bridge strength is an attribute of a bridge (where a bridge is analogous to an edge in a graph database). The bridge strength is a measure of how important the relation is between the stances (nodes) that are connected by a bridge.

According to another aspect, "kudos" is a system-defined, game theoretic, commodity inherent to the underlying measure of effectiveness of a stance or bridge. Kudos is one of a number of possible economic constructs that allow the user to assess cost/benefit when interacting with the system. Thus, for example, the system allows users to earn kudos as part of their interaction with the system, and users expend kudos as a means of showing the strength of their feeling for any given information content or ordering of information. Among other characteristics, kudos has a primarily emotional value to the user as an involved participant of the system, e.g., its use provides a measure of the user's commitment to the efficacy of their metadata and other attributions. As will be seen, the system allows users to "side" with expressed opinion, constructed argument, or supporting web content, and allows all such commitment to be measured in economic terms, preferably via kudos. Such strength of association may also be both displayed graphically in a number of ways and processed for associative and qualitative purposes and systemic reasoning.

A "vote" is a data object that works as follows. A user can vote on a stance or reply to a stance. As used herein, "voting" by a user puts one (1) (or some other number of) kudos on the type voted and creates a vote object of the type voted (e.g., the user votes "agree" and the stance gets a kudos in an "agree" bucket and an agree vote). Votes are associated with a stance they are voted on, while the kudos value accumulates according to a kudos propagation scheme in a manner described below. A user may change his or her vote, but preferably the system enforces a one vote per stance requirement (with kudos moving with the vote). By replying to a stance, a user creates a new stance, and a bridge to that stance, and this action automatically votes the user in agreement with the stance he or she made. If the user is replying to a stance that he or she had not previously voted on, the system automatically votes the user on the same type as his or her reply (e.g., if agree-reply, it puts an agree-vote). When a user replies to a stance he or she already voted on, it does not change the user's vote. According to the voting approach herein, a user can vote with his or her reply, thereby enriching the reply in a quantitative way.

Thus, according to this disclosure, a vote is an object referring to a user having voted on a stance, and the kudos is added to by the voting, and the kudos propagates. Generalizing, a system for "voting" on a stance is provided, where an entity in the system tells the system that it supports or opposes a given stance. Preferably, the system records information about this vote including but not limited to how, where, why, by whom, and when the vote was made. This data is stored in the system and associated with the stance and entity in question. In one embodiment, the system enforces a requirement that a participant must vote in order to respond to a given stance.

A "kudos propagation" function works by assigning to a stance two or more categories of kudos. In one example embodiment, positive (agree) and negative (disagree) categories are implemented; however, many other categories and types of voting are possible including, without limitation, interest, gradations of opinion, spam, off topic, new topic, emotions, and so on.

For kudos propagation in linked stances, preferably the kudos of any given category is the quantity of votes in that category plus the sum of kudos assigned to all of its descendants, where descendants are defined as stances that have bridges in direction from themselves to the root stance, as well as stances that have bridges in direction from themselves to those stances, and so on. In this way, a stance with no descendants has kudos in a given category equal to the number of votes in that category, e.g., x. According to the propagation scheme, for the same category, a parent of this stance has kudos equal to its own votes in that category, y, plus x; for the same category a parent of the parent has kudos equal to its own votes in that category, z, plus y+x, and so on. Propagation of certain metrics typically requires combining related (e.g., by being opposite) metrics when traversing objects. In this way, for kudos propagation in negatively-linked stances the process is the same as any linked stances except that a sign alternation occurs; stated another way, the positive kudos of a negatively-linked stance is added to the negative kudos of the parent, because the positive kudos in question has supported a negative position relative to the parent. Generalizing, this scoring approach defines a recursive system of measuring data. In particular, the system measures one or more attributes or measured quantities for any data object (a piece of information) in the system. As noted above, each object in the system may contain directional links to other objects. According to the kudos propagation scheme, preferably the measure of an attribute is recursively added by carrying it along these links in the given direction and summing it with the measure of a chosen attribute (which may be the same or different) on the next piece of information, and so on, to create a new attribute, namely, the recursively summed value of the given attribute. This scoring method could also be applied to adding different attributes of information linked together, even without directional links. The propagation method also includes the scope of other mathematical operations on the measurements of the attribute at each step of the process, and not just additive operations. Thus, in one example, this may be implemented by changing a balance record for each stance when one of its descendants has a change in kudos. Other possible implementations include, without limitation, centrally calculating the appropriate totals periodically, continuously, or on demand.

One form of information network of stances and bridges is called a "tug." The system creates a tug when it relates stances one-to-one using differing bridge relations, such as positive and negative, or type x, type y, type z, and so on. This forms a tree of stances where each node has two or more categories of branches stemming from it, namely, preferably those positively relating to the node, and those negatively relating to the node. The tug may also be implemented with many-to-many or one-to-many relations between stances, and a sub-tree selected for viewing by the user out of the multi-dimensional map. A "tug of war" network is a network of stances connected by positive and negative bridges to each other. For the sake of illustration, the top stance is termed the "root" stance but it represents any stance in the information network, and it may itself be connected to stances not shown. In this example, all of the stances in the figure can be said to be descendants of the root stance.

The system may provide the user or viewer of an information network a "multi-column layout" to function as a visual representation of stances and bridges in the system. In this approach, and at each stance, the stances related by one type of bridge are displayed in a column on one side, and those related by another type of bridge are displayed in a column on the other side. An information network as described herein can be displayed in many columns by assigning each stance an additional two columns for its descendants, or the display can be compressed into two total columns by nesting children within each other, or any number of columns in between. One way to achieve this compression is by interleaving the columns together.

A stance is deemed to be "root" of a tree being examined by an entity in the system—possibly a user using one of the column views described above, but it could be any form of accessing the network of information in the system, e.g., by a user's preference for this root stance or by the system judging it important. In one embodiment, a judge of importance is providing by making any web page the user wishes to engage with be the root stance for that session of engagement; this is merely representative, as many other factors could go into choosing a root stance such as the user centering the system on a stance of their choice, or the system processing the information to choose a stance for the user.

Preferably, the system assigns "form" (formatting) to given relationships among information in the system. In general, a form is any visual attribute of a display, such as color, texture, and style. Functionally, form serves to display one or more aspects of the data contained in the system to users in the system. As has been explained, the data display includes, without limitation, the type of relation one stance bears to another. Preferably, the system assigns form by reading the bridge between two stances and processing the context around them. Preferably, the form of a stance is calculated dynamically (on-the-fly) by the system for a specific display called upon by the user, and it is then used in a way that the client device understands (i.e. to display form). In one display embodiment, the root (i.e., the root stance for a given instance of user engagement with information) receives no special form; all stances directly connected to the root stance by positive bridges might then receive one form (e.g. blue color, but any form would function), and all those by negative bridges receive a different form (e.g., orange color, but any form would function). The stances directly connected to the root stance can be said to be nested zero levels—stances directly connected to these zero level stances are nested one level, and so on. Preferably, and as a matter of form, the system assigns stances nested beyond level zero as follows: if the connection is positive, the stance receives the same form as the stance previous in level to which it is connected. If the connection is negative and the stance previous in level to which it is connected is positive or negative in form (blue or orange in this example), then the stance is assigned a third mixed negative form (e.g., grey, but any form distinct from the previous two would work). If the connection is negative and the stance previous in level to which it is connected is mixed negative in form (grey), then it is assigned the form of the zero-nested stance to which it ultimately traces back. Other ways to implement this display view include, without limitation: always assigning negative connections one form, and positive another, regardless of nesting level; choosing distinct mixed negative forms for those negatively connecting to positive or negative stances (for four forms in total); and creating new forms for every level of nesting (creating potentially infinite forms).

Thus, according to the formatting techniques herein, a stance's lineage is factored into its style of appearance.

Several additional terms and phrases are described in the further detailed description of the system that now follows.
Enabling Participants to Discuss, Debate, Connect and Compare Information With the above definitions, the following describes the system of this disclosure.

According to this disclosure, a system and method are provided to facilitate organizing information through user behavior and system processes. The system brings together users, content, media, conversations, information, opinions and debates in a highly-navigable, organized content network. The functional building blocks of the system are stances and bridges, which collectively implement an information network. Typically, the information network is created by a first entity of the system (a process or a user or other functioning body) creating a stance that contains information to be discussed; then, a second entity of the system creates another stance that the second entity deems related to the first stance. The system is told by the second entity what kind of relation the second stance has to the first; typically, these relations include, without limitation: a positive or supporting relation; a negative or critical relation; a conceptual relation; a content similarity relation; agreeing relation; a disagreeing relation; and a train of thought relation. The system stores this relation in a bridge that is stored in the system. Stances in the system can be associated with new or existing stances in this way.

Figure 2:
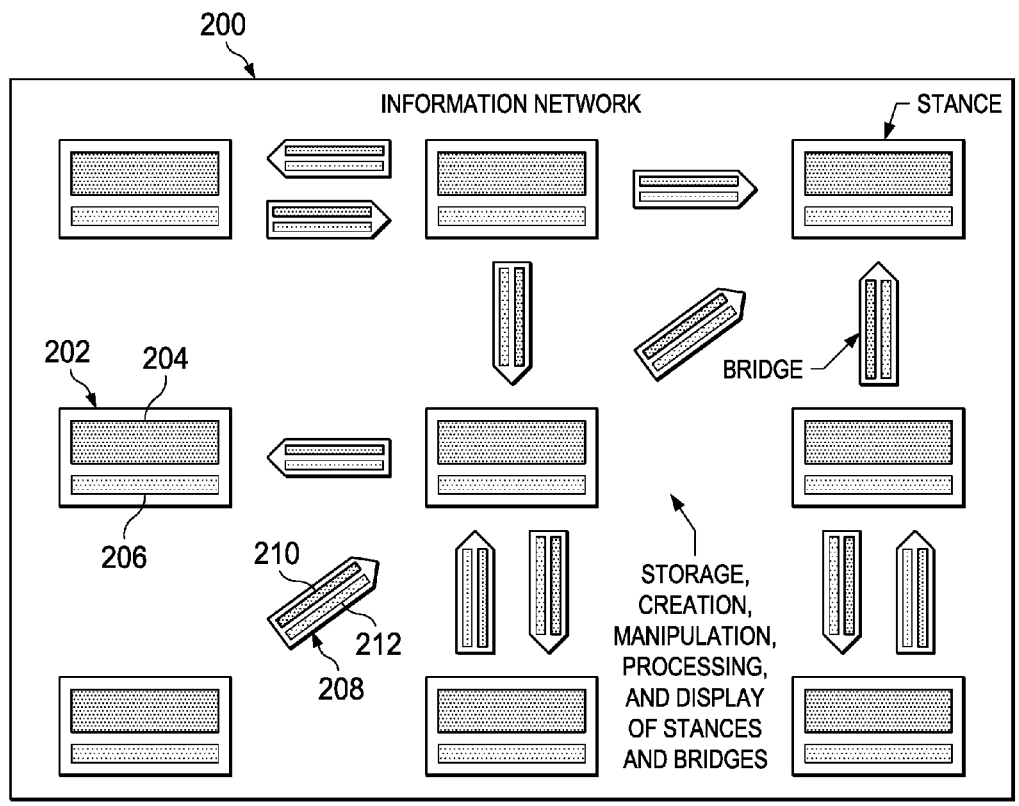
FIG. 2 illustrates an information network comprising a set of stances and bridges according to this disclosure.

FIG. 2 illustrates an information network 200 comprising a set of stances and bridges according to this disclosure. A given stance 202 includes prime-information 204, and associated meta-information 206, and a given bridge 208 includes initial information 210, and collected information 212. As illustrated, the information network 200 includes a plurality of stances and bridges that are created, manipulated, processed and displayed by the system. There is no restriction on the number of stances and bridges, and one or more of such information networks may overlap with one another.

Figure 3:
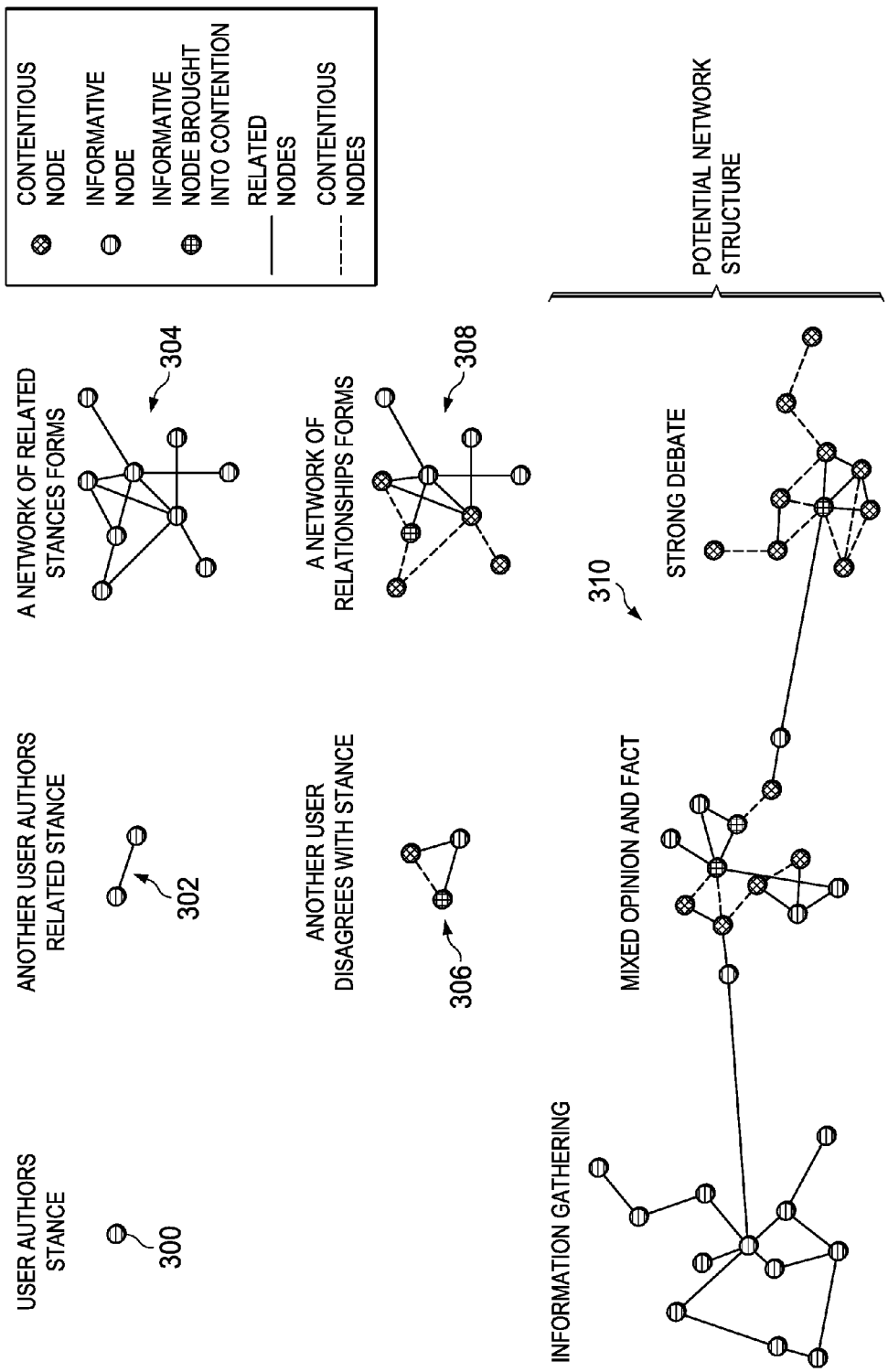
FIG. 3 illustrates how an information network is grown as participants interact with the stances and bridges.

FIG. 3 illustrates how an information network grows as users interact with stances and bridges. As will be described, and for purposes of illustration only, this network is said to comprise various types of nodes including a "contentious" node, an "informative" node, and an information nodes brought into contention. Nodes in the network may be related and/or contentious. The network begins with the user author's stance, which creates an informative node 300. Another user author's related stance is added as an informative node 302, creating the start of an information network. After additional stances are received, a set of informative nodes is created, such as shown at 304. On the other hand, if another user disagrees with a stance, the result is a contentious node 306. The resulting network 308 may then include both related nodes and contentious nodes. As more information gathering occurs, the network structure changes dynamically, as illustrated in 310. In this example, the network exhibits areas of information gathering, areas of mixed opinion and fact, and areas of strong debate (as indicated by the number of contentious nodes). Of course, this figure represents an example information network, which should not be taken to limit this disclosure.

Figure 4:
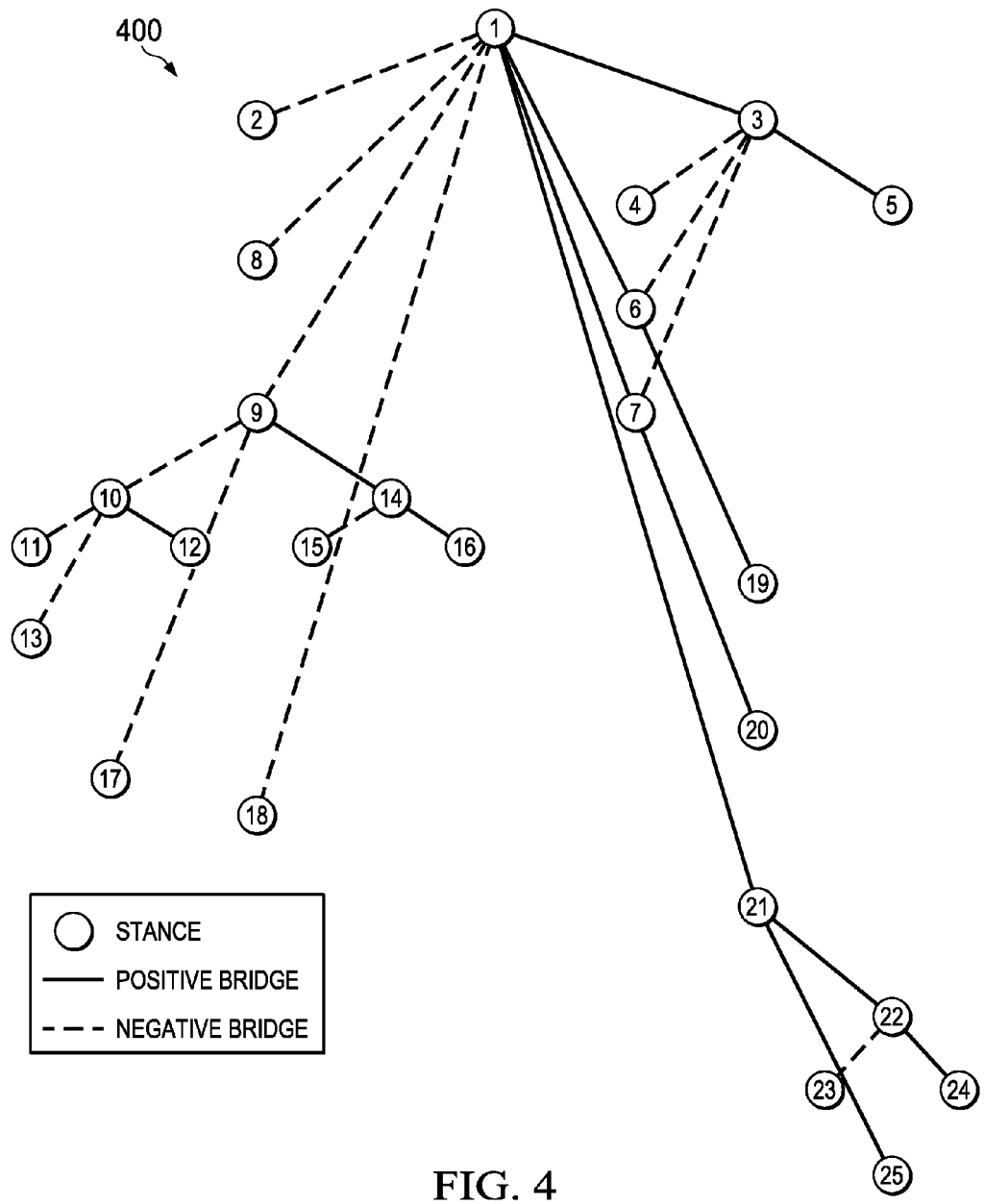
FIG. 4 is an example information network of stances connected to each other by positive and negative bridges to form a tug of war network.

As noted above, one form of information network of stances and bridges is called a "tug." Preferably, the system creates a tug when it relates stances one-to-one using differing bridge relations, such as positive and negative, or type x, type y, type z, and so on. This forms a tree of stances where each node has two categories of branches stemming from it, namely, those positively relating to the node, and those negatively relating to the node. FIG. 4 illustrates a representative "tug of war" network 400, which is a network of stances connected by positive and negative bridges to each other. For the sake of illustration, the top stance 402 is termed the "root" stance, but it represents any stance in the information network, and it may itself be connected to stances not shown. In this example, all of the other stances illustrated are descendants of the root stance. The figure illustrates the bridges as being positive (agree) or negative (disagree), although these attributes are merely representative, as has been described.

Figure 5:
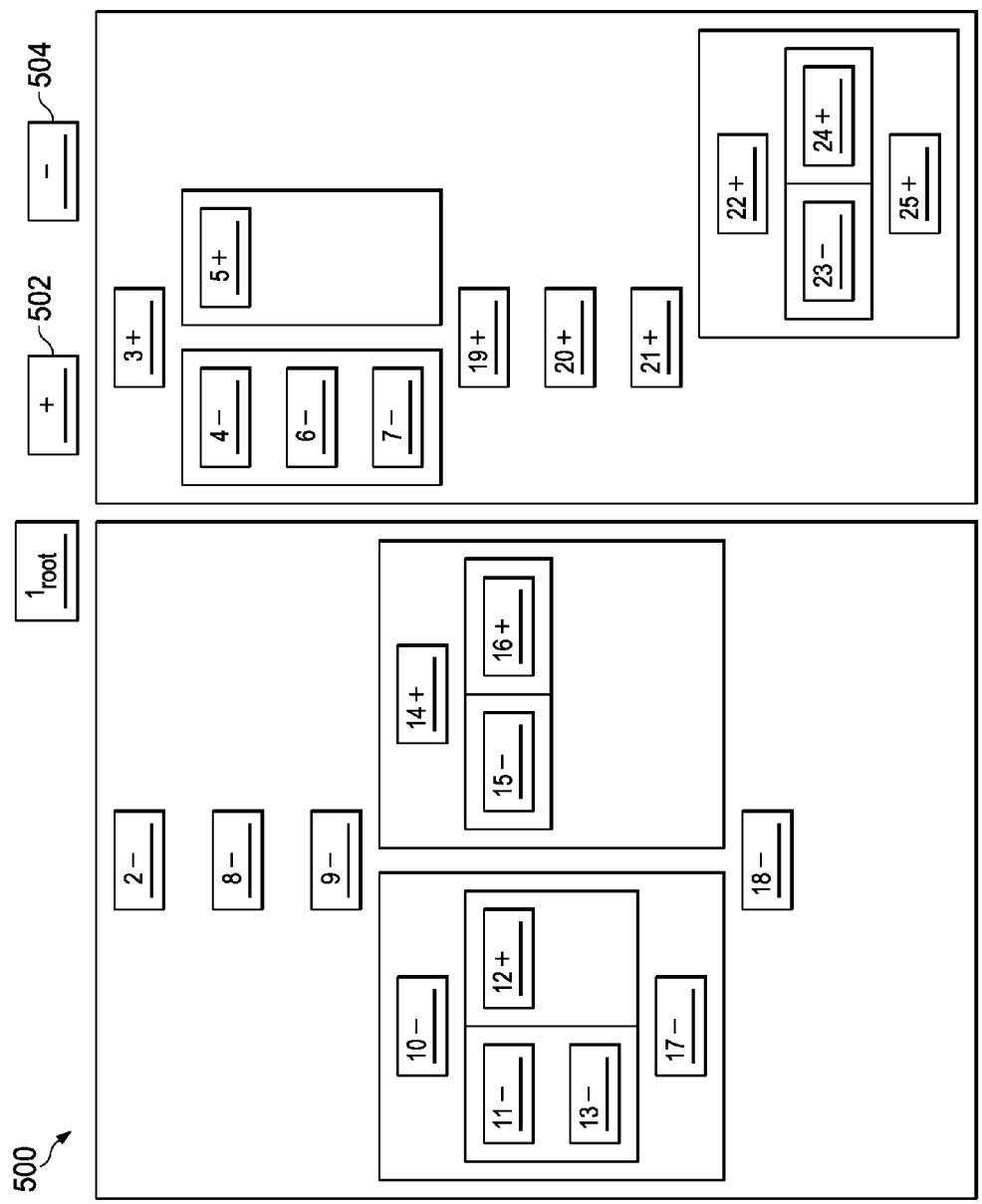
FIG. 5 is a representative column display corresponding to the information network shown in FIG. 4.

Preferably, the system provides a display comprising a "multi-column layout" to function for the user of an information network as a visual representation of the stances and bridges that comprise that network. In one preferred approach, at each stance, the stances related by one type of bridge are displayed in a column on one side, and those related by another type of bridge are displayed in a column on the other side. A representative information network column display 500 is shown in FIG. 5. The information network illustrated in this figure corresponds to the network shown in FIG. 4, with the same numbered stances mapping to each other across the figures. The positive box 502 means that the stance is positively related to its parent, and the negative box 504 means that the stance is negatively related to its parent. Preferably, each time a stance has negative or positive connections to it, a column is formed to display them. Of course, as more levels of nesting occur, the more columns and thus horizontal space the system requires for display. To address this, one or more columns may be compressed together by interleaving their stances and introducing a visual distinction that the stance belongs on one "side" or the other. The resulting display 600 is illustrated in FIG. 6. In this example, all of the columns have been collapsed to two columns 602 and 604, and the visual indication of "side" is an offsetting of the child stance from the center of the column to the left for negative, and to the right for positive. FIGS. 5-6 thus illustrate how an information network can be displayed in many columns by assigning each stance an additional two columns for its descendants, or the display can be compressed into two total columns by nesting children within each other, or any number of columns in between. As illustrated, one way to achieve this compression is by interleaving the columns together.

Figure 7A:
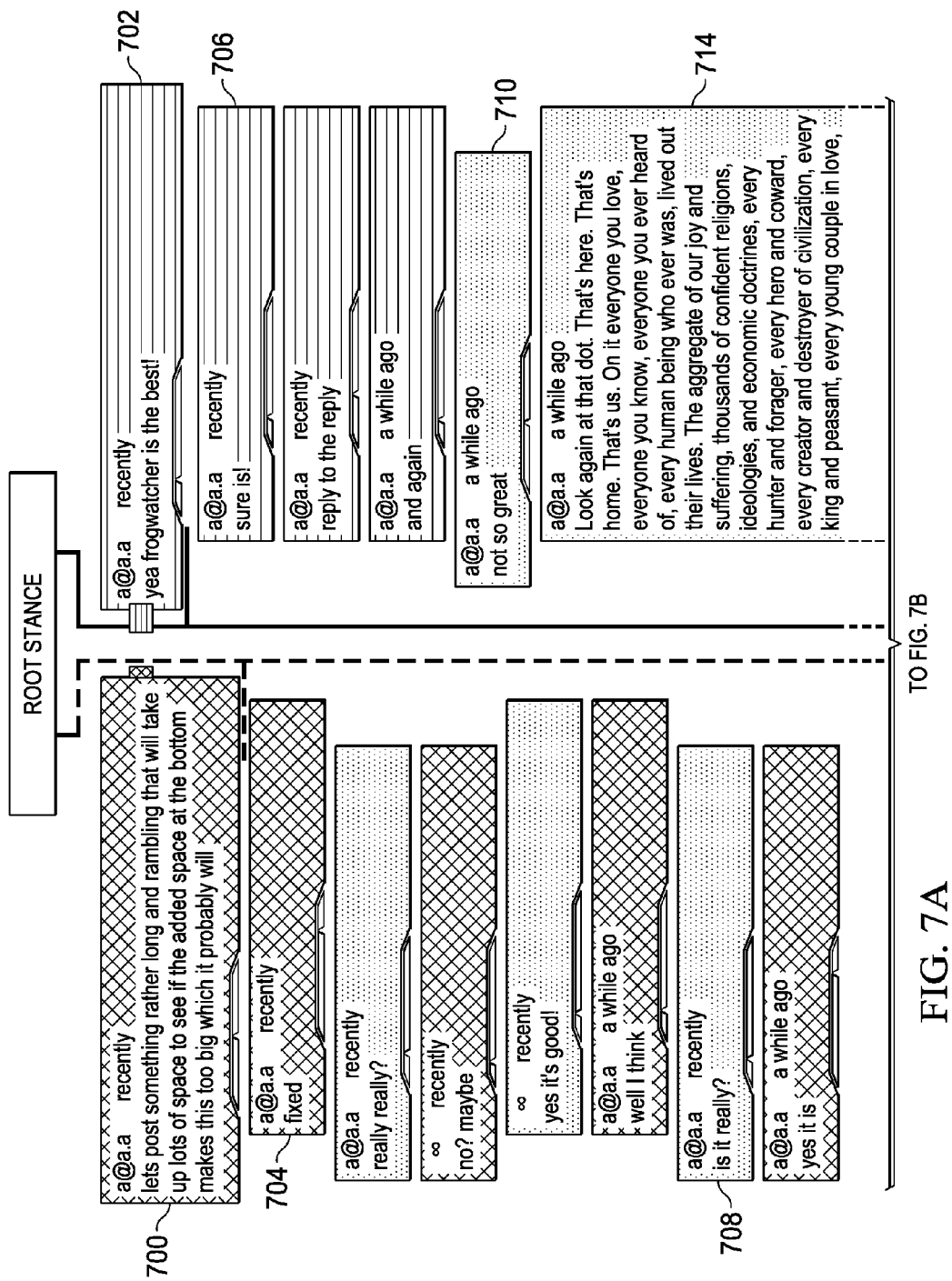
FIGS. 7A and 7B illustrate how formatting may be used to distinguish stances.
Figure 7B:
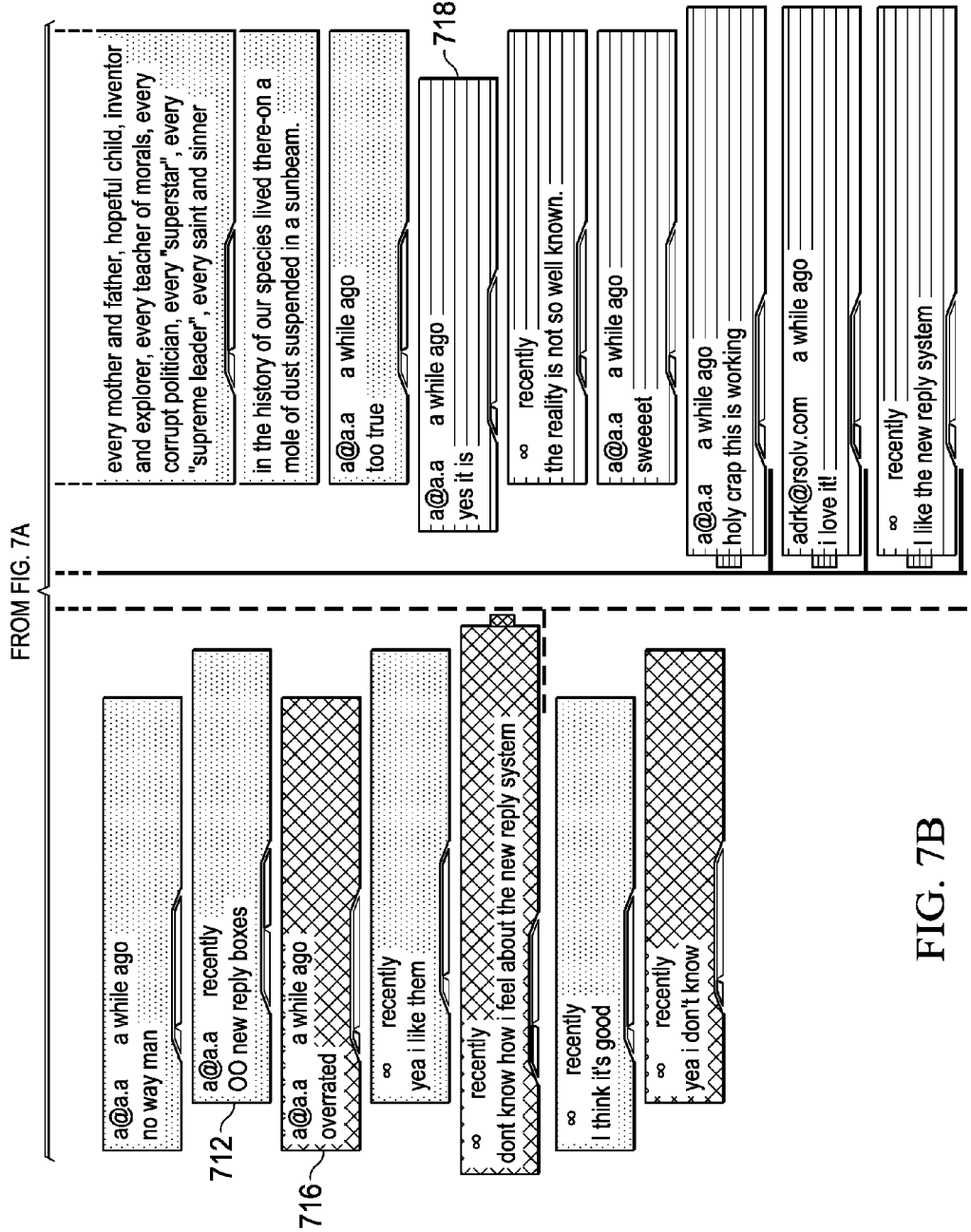

As noted above, preferably the system assigns formatting to given relationships among information in the system. In general, a form is any visual attribute of a display, such as color, texture, and style. FIG. 7 illustrates one representative approach. In this example network, a negatively linked stance 700 is colored in a first color (e.g., orange), while a positively linked stance 702 is colored in a second color (e.g., blue). Stance 704 is a stance positively linked to a negatively linked stance, and thus it is formatted in the first color. Stance 706 is positively linked to a positively linked stance, and thus it is formatted in the second color. Stance 708, however, is negatively linked to a negatively linked stance, and it is represented in a third color (e.g., grey). Likewise, stance 710 is a stance negatively linked to a positively linked stance, so it is presented in the third color. Stance 712 is a stance positively linked to a stance negatively linked to a negatively linked stance, so it is presented in the third color. Stance 714 is a stance positively linked to a stance that is negatively linked to a positively linked stance, so it too is presented in the third color. Stance 716 is a stance negatively linked to a stance that is negatively linked to a negatively linked stance, so it is represented in the first color. Stance 718 is a stance negatively linked to a stance that is negatively linked to a positively linked stance, so it is presented in the second color.

Typically, in use an information network created by user interactions with the system contains many nodes with many links between those nodes, and many ways of following those links and nodes. As noted above, the nodes in the network are stances, and the links are bridges. In any navigation of an information network, the system preferably calculates which stances to show the user, e.g., based on what stance the user is currently viewing, what search terms the user has entered, what stances are connected by bridges to the stance the user is viewing, how strong those bridges are relative to each other, how many votes stances in the network have, any other stance or bridge attributes, and the user's preferences for dealing with all of the above parameters. Navigation of this network includes, without limitation, methods described above and below with the use of columns, form, and interconnected-network-like visualizations. These visualizations include, for example, a "bridge" view, a "tension" view, and a "list view." Each of these views is now described.

As used herein, a "bridge view" is an interconnected-network-like (or spider-web-like, neural-network-like, or multi-dimensional-link-based array) way for a user to visually navigate the network of bridges and stances. Preferably, this view represents stances with visual markers and bridges with paths between the markers. When a user selects a stance, the view centers on that stance and creates a map displaying bridges and stances connected to the central stance, with parameters set by the user. The user specifies parameters, such as how many degrees of separation from the central stance the map should present, what minimum bridge strength the map should follow, and whether the map should include a history as new stances are selected. Preferably, the user has ways of obtaining more information about a given stance in this environment, such as a mouse-over event revealing a summary. When the user selects a stance, the map recreates itself centering on the new stance. At any point in this navigation, the user can choose to see the full contents of a stance.

Figure 8:
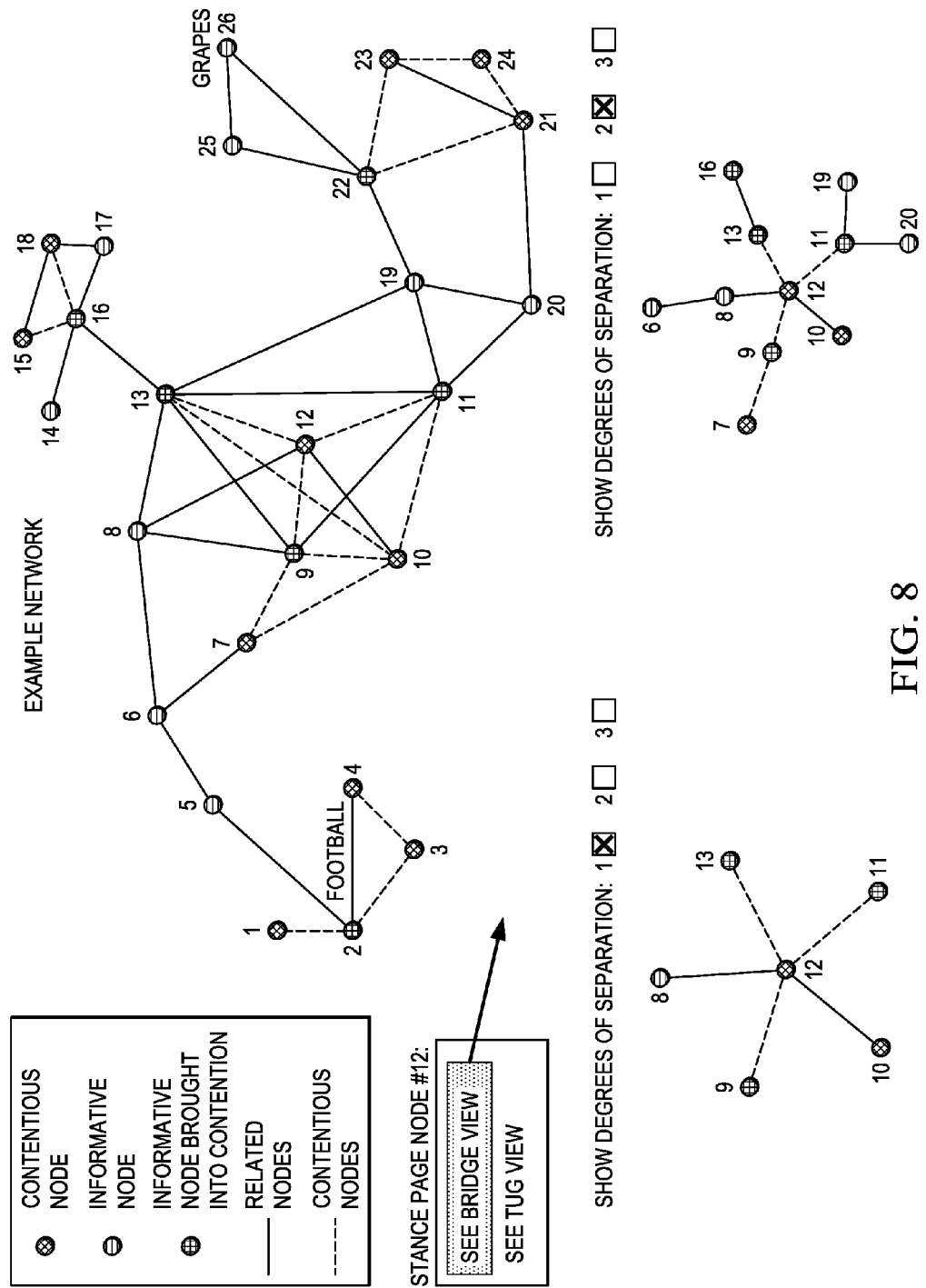
FIG. 8 illustrates navigation by bridge display mode.

FIG. 8 illustrates navigation by the bridge view. As shown, the example information network 800 includes contentious nodes, informative nodes, and informative nodes brought into contention. The user may click on any node, which (in this viewing mode) centers the view on that node and recalculates the connections to its related nodes. The user may control the display resolution by selecting one or more display parameters, such as a degree of separation. Thus, the possible paths to display may be determined by filtering on strength and number of jumps from a current stance.

As used herein, a "tension view" is a graphical way of visualizing a debate between stances. This view represents stances with visual markers, and it arranges the stances in a circle around a central "crowd opinion" marker. The stances are arranged and displayed on the circle based on how similar and opposing they are to each other—properties that could be calculated by the system or decided by the user or decided by some future factor. Preferably, the stances in the circle are connected to the central marker by bridges. The central marker is pulled by each stance based on that stances popular approval as calculated by the system, based on the stances' and bridges' algorithmic attributes. In one display approach, how close the central marker is displayed in the circle to any group of stances shows the user which group of stances is winning the debate in the collective eyes of all users involved. A finer resolution for visualizing this tension between the stances around the circle may be a background "tension pattern" of varying gradients of color which can change noticeably, even when the central marker does not appear to move, based on changing stance attributes. In this type of display approach, the system calculates the selection of stances displayed in the circle based on the user's current viewing characteristics and the attributes of the stances and bridges involved. A user can select a stance to retrieve more information about it, and he or she can also recalibrate the circle around a given stance. At any point in this navigation, the user can choose to see the full contents of a stance.

The tension view described above is a tailored instance of a tension graph. Like any graph, a tension graph visually displays a correlation or correlations from a data set. The tension graph as used herein differs from existing graphs by the correlation it is able to display. A normal two-axis graph displays a set of data with x and y variables as a scatter plot—unconnected points about which a correlation of either x components or y components is visible across the dataset, but a correlation of both x and y components across the dataset is obscured by the disconnected nature of the display. A tension graph, unlike a two-axis graph, intrinsically connects the x and y components of all elements in the dataset by wrapping the plot into a circle and attaching all elements to a central marker. One axis, in this example the x axis, is turned into a polar coordinate, so the data set is arranged around a fixed circle where the greater their x value, the greater their polar angle, with the scale adjusted so that the lowest x-value in the dataset is at 0 degrees and the highest x-value is at 360 degrees. Other variations on this scaling rule are also possible. On the inside of the circle a tension marker is depicted, which acts to display the correlation between x and y axis by connecting to every element on the circumference of the circle with a separate elastic spring. The remaining axis, the y axis, is mapped to the tension in the springs whereby the value of the y variable borne by the element in question is equal to the tension in the spring which connects a given element to the central tension marker. After the x and y components of every element have so been accounted for, the tensions and endpoints of the springs are used to calculate the rest position of the central tension marker. Because the y variable has been turned into a tension instead of a distance, the position of the central tension marker relative to the elements around the circle represents a correlation between both x and y variables in which the specific y value of any given element is influenced by the y values of its neighbors—a correlation which was previously invisible.

Figure 9:
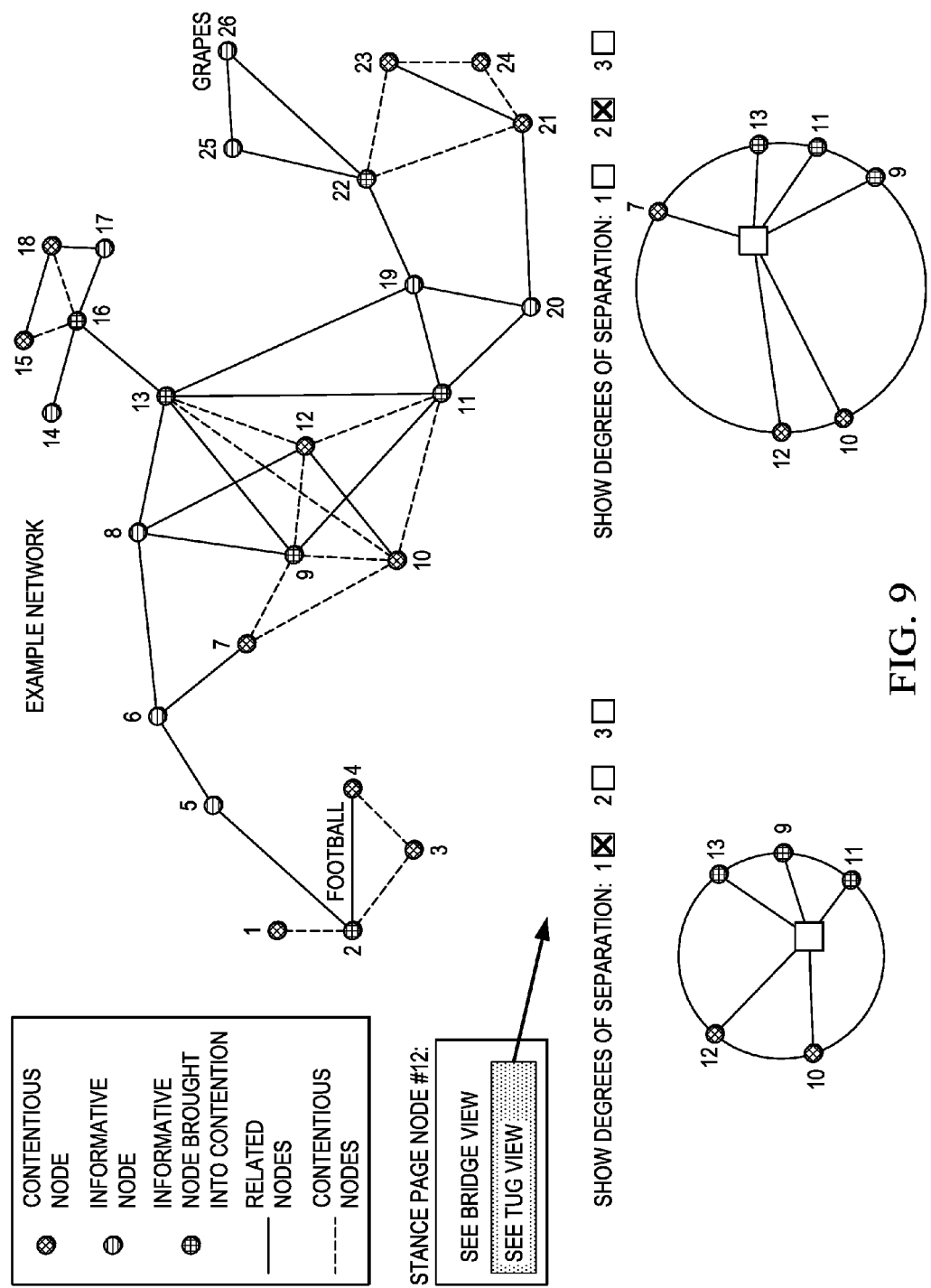
FIG. 9 illustrates navigation by tension graph display mode.

FIG. 9 illustrates navigation by the tension view. As shown, the example information network includes contentious nodes, informative nodes, and informative nodes brought into contention. The user may click on any node, which (in this viewing mode) centers the view on that node and recalculates the tug based on the new node's related nodes. The user may select the resolution by selecting one or more display parameters, such as a degree of separation.

A "list view" is a graphically non-intensive way of visualizing paths through the system. When the user searches for terms, preferably the system returns a set of titles for stances that it thinks the user would like to see. Preferably, the user also has one or more ways of obtaining more information about a given stance in this environment, such as a mouse-over event revealing a summary. When the user selects a stance from the set, the system generates a nested set of one or more stances based primarily on bridges connected to the selected stance, and those bridge strengths. This mechanism of selection and display preferably is iterative, so the user can continue to follow bridges to new sets of stances; preferably, the selection and display also is historical so the user can see one or more (or all) previous stances on the path to his or her current set of stances. At any point in this navigation, the user can choose to see the full contents of a stance.

FIG. 10 illustrates navigation by the list view. As shown, the example information network once again includes contentious nodes, informative nodes, and informative nodes brought into contention. The user may enter a search term, click on any numbered node in resulting connections list, which (in this viewing mode) causes the next list to be generated. The user may also select one or more filter parameters, such as "connections" or "contentions."

According to a further feature of the system, "thread highlighting" is implemented as a method to visualize the relationships of stances and bridges in the system when displayed in a compact form. As used herein, a "thread" is a collection of stances and bridges that are connected together by a chain-like series of relations, such as a root stance (called the root stance for explanation, but it can be any stance in the system) and all stances connected to it, and all stances connected to those, and so on. The system preferably maintains threads by the nature of stances and bridges, and retrieves them from a system data store by following the connection information in bridges and stances to subsequent bridges and stances. The directional information stored in a bridge allows the system to differentiate between stances connected to a stance, and stances connected from a stance. Thus, for example, if stance A is connected by a bridge from A to B, then stance A is connected towards B, and thus is nested below B. A bridge can be used in either direction, although preferably the directional information allows for distinction in the structure of the information network. Stated another way, preferably each stance has parents and descendants. Descendants are defined as stances that have bridges in direction from themselves to the root stance, as well as stances that have bridges in direction from themselves to those stances, and so on. Parents are defined as stances that the root stances have bridges to in a direction from a particular root stance to the parents, as well as stances that the parents would consider parents, and so on. Thus, a thread around any given root stance preferably is all of its parents and descendants. The entity selecting and interacting with these stances could be a user or any other entity of, or connected to, the system. Preferably, thread highlighting is implemented by changing the appearance of stances not involved in the currently selected thread, e.g., using graphics on the client. Highlighting could be implemented many other ways such as, without limitation, hiding stances not part of the thread, changing the appearance of stances that are a part of the thread, changing the positions of stances inside and outside the thread, and otherwise altering the appearance of stances to the user.

Figure 11B:
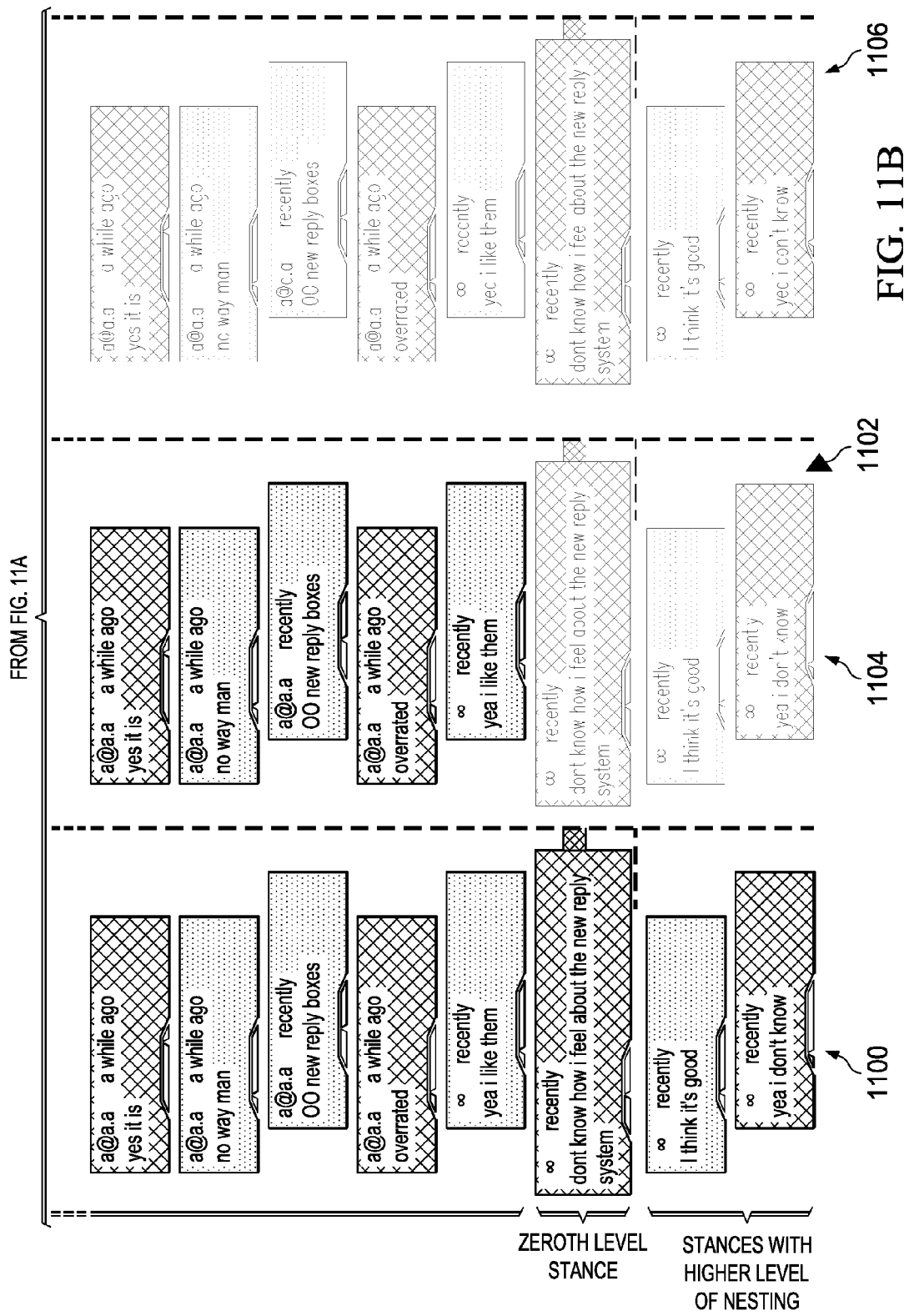

FIG. 11 illustrates the thread highlighting function. This example illustrates how thread highlighting distinguishes the relations between stances. This function helps compress an entire tree view of a network to a column view. In this example, the stances represent the result of possible subsets of stances and bridges, and the arrowhead symbol 1102 represents the selected stance. Reference 1100 illustrates a default, non-highlighted view of two zero-level stances forming part of a tug of war network. In this case, each zero-level stance also has a collection of higher-level stances below it. In the second panel, reference 1104, a stance is selected; as a result, the system highlights all of the stances that thread "from" the highlighted stance, i.e. those that connect to it and those that connect to those that connect. In the third panel, reference 1106, when a stance is selected, the system highlights all of the stances that thread "before" it, i.e. those that it is connected to, and that those are connected to. These examples illustrate how highlighting can be used to distinguish threads and sub-threads from each other.

Figure 12:
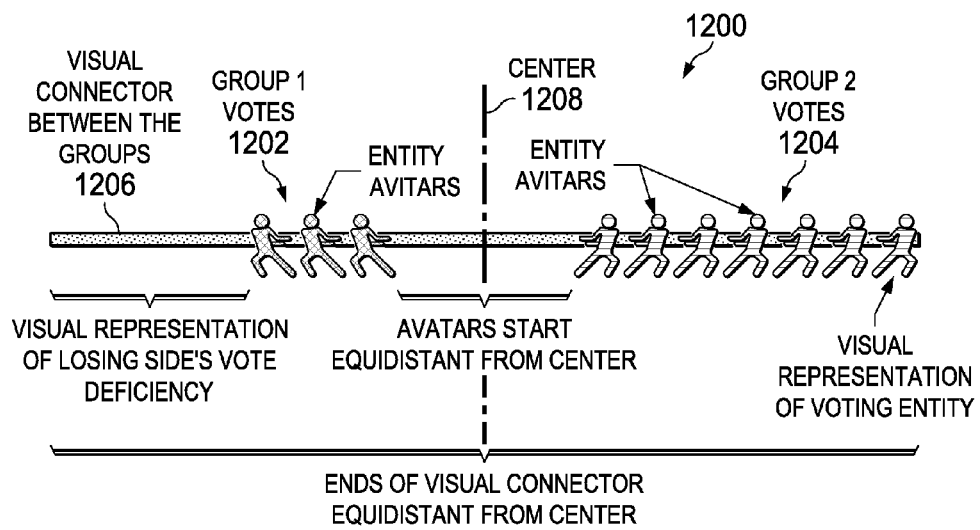
FIG. 12 illustrates a tug meter display function.

Another visualization that may be provided by the system to visualize the direct support and opposition for a stance is referred to as a "tug meter," such as shown in FIG. 12 as reference 1200. In this embodiment, an avatar such as a stick figure represents each entity that has voted on the stance. The entities are grouped into two or more groups 1202 and 1204 by how they voted, with a visual connection 1206 between them as in a tug of war. An avatar is any graphical form representing, for example, a user, group of users, entity, or collection of entities in the system. This tug meter device takes data from the system about votes on a stance and displays them visually against each other for quick recognition by the user of which side is winning. Preferably, there is a visual cue to compare each side by the distance of visual connection not filled by avatars. For example, each group of avatars begins equidistant from a center point 1208 and extends for as many entities there are in the group; the visual connector between the groups (such as a line) extends both ends equidistant from the center point so that the larger group is completely accounted for in the visual representation. This display leaves a visible connector overhang on the side with the smaller group. Preferably, there is also a process to upgrade the symbols of the avatars so that each avatar represents more than one voting entity or a more important voting entity, for example, a stick figure can upgrade into a tractor that counts as several stick figures. Preferably, a configuration tool is provided to enable avatars to be customized. Also, preferably the system is able to distinguish the avatar of the user currently viewing the tug meter, offering capabilities to the using entity including, without limitation, avatar customization and vote changing.

Figure 13:
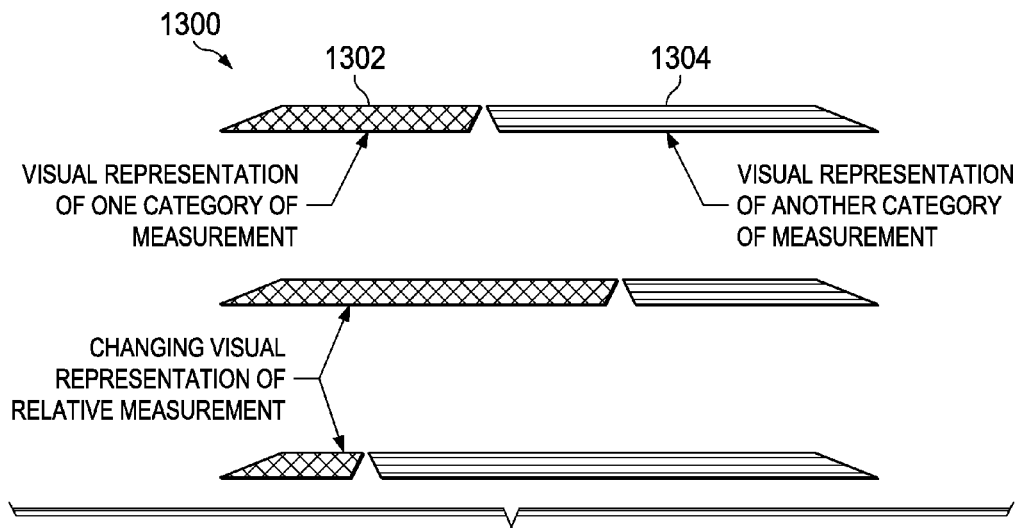
FIG. 13 illustrates a kudos meter display function.

Preferably, the system also implements a way to visualize accrued support and opposition for a stance or a collection of stances. This visualization is a "kudos meter" 1300, such as shown in FIG. 13. One visual element of the meter, such as a polygon of a certain color (e.g. blue) 1302, represents a collection of kudos by some visual characteristic such as size, shape, or intensity. A second visual element 1304 of the meter represents a different collection of kudos with the same methods. This method works for any number of visual elements with corresponding collections of kudos or any quantifiable data. For example, a blue polygon (or any other geometric or other object) might be used next to an orange polygon to represent accumulations of kudos supporting positive and negative positions to the stance respectively. The horizontal dimension of the polygon then represents the amount of kudos on one side relative to the amount of kudos on the other; in this display embodiment, the total horizontal dimension of the two polygons combined remains constant for any values of kudos, but the polygons change in size relative to each other. The display could also be implemented with an absolute rather than relative scale, or relative to an external scale, or using more dimensions of change, or other forms of visualization, or any combination thereof.

Figure 14:
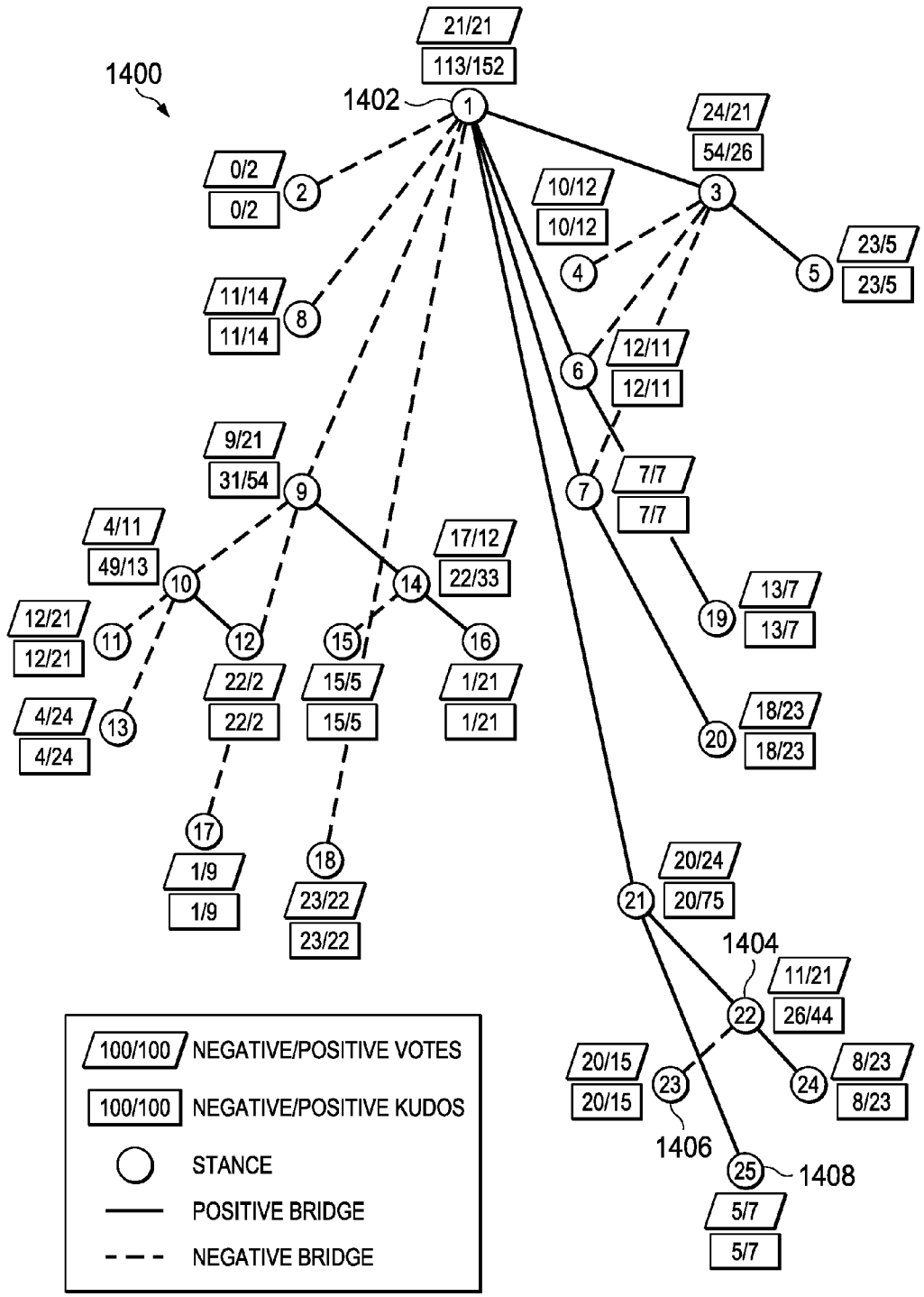
FIG. 14 illustrates the kudos propagation function.

FIG. 14 illustrates the "kudos propagation" function 1400. As described above, preferably this function works by assigning to a stance (e.g., the root stance 1402 for exemplary purposes) two or more categories of kudos. In one example embodiment, positive and negative categories are implemented to coincide with the voting categories outlined above. For kudos propagation in linked stances, preferably the kudos of any given category is the quantity of votes in that category plus the sum of kudos assigned to all of its descendants, where descendants are defined as stances that have bridges in direction from themselves to the root stance, as well as stances that have bridges in direction from themselves to those stances, and so on. In this way, a stance with no descendants has kudos in a given category equal to the number of votes in that category, e.g., x. According to the propagation scheme, for the same category, a parent of this stance has kudos equal to its own votes in that category, y, plus x; for the same category a parent of the parent has kudos equal to its own votes in that category, z, plus y+x, and so on. Propagation of certain metrics typically requires combining related (e.g., by being opposite) metrics when traversing objects. In this way, for kudos propagation in negatively-linked stances the process is the same as any linked stances except that a sign alternation occurs. In other words, the positive kudos of a negatively-linked stance is added to the negative kudos of the parent, because the positive kudos in question has supported a negative position relative to the parent.

The information network shown in FIG. 14 is the same network as depicted in FIGS. 4-5, with the same numbered stances mapping to each other across the stances. As illustrated, preferably the measured data propagates up from any number of descendants over any number of connections to provide enhanced information about the information network. According to the kudos propagation scheme, preferably the measure of attribute is recursively added by carrying it along these links in the given direction and summing it with the measure of a chosen attribute (which may be the same or different) on the next piece of information, and so on, to create a new attribute: the recursively summed value of the given attribute. For example, node 1404 has both positive and negative children propagating their kudos up to join its native kudos. Node 1406 is negatively connected to its parent, so this node's positive kudos propagates to the negative side of the parent. Node 1408 has no children, so its kudos equals its votes.

This scoring approach defines a recursive system of measuring data. As noted above, the system measures one or more attributes or measured quantities for any data object (a piece of information) in the system. As noted above, each data object in the system may contain directional links to other data objects. According to the kudos propagation scheme, preferably the measure of attribute is recursively added by carrying it along these links in the given direction and summing it with the measure of a chosen attribute (which may be the same or different) on the next piece of information, and so on, to create a new attribute. This scoring method could also be applied to adding different attributes of information linked together, even without directional links. The propagation method may also be implemented using other mathematical operations on the measurements of the attribute at each step of the process.

According to another feature, "stance ordering" provides a way to track and act upon the information the system has about each stance to rank a set of stances by a particular parameter. For example, preferably kudos is tracked for each stance and the system can create a list of stances ordered according to their amount of kudos by using known data management software (such as a database and database query). Preferably, the system displays this list to the user. One parameter that stances can be ordered by is an "activity rating" that can be of any data object or collection of objects in the system, such as a bridge or a stance; this rating may be calculated by taking a weighted sum of all occurrences of interaction the system has with the information, and dividing it by the length of time the information has existed, or some other period of time. An occurrence of interaction by the system with the information includes, without limitation, retrieving a bridge or stance for a user and making a new connection to a stance or bridge. An "activity percentile" of an entity is its activity rating scored on a scale relative to the rest of the ratings in the system. In one embodiment, the system calculates this percentile by finding the maximum and minimum ratings in the system and then calculating the ratio of any given rating to these maximum and minimum ratings. Stances, or any information in the system, can be ordered by any parameter known by the system or inputted to the system about them. In addition to ordering vertically, these methods can be used to order information in all dimensions in space, as well as other forms of ordering, such as adjusting information's visibility according to rank of a parameter, ordering information's appearance in time, and changing the visual appearance of information based on these parameters. As an example, a method of displaying only a certain number of stances and bridges to the user (where this number is chosen by the user or another entity in the system) is provided by ordering the stances by a parameter chosen by the user or another entity in the system and displaying stances from one end of the ordered list until the number is reached. This effectively shows and hides stances based on one or more ordering parameters.

Figure 15:
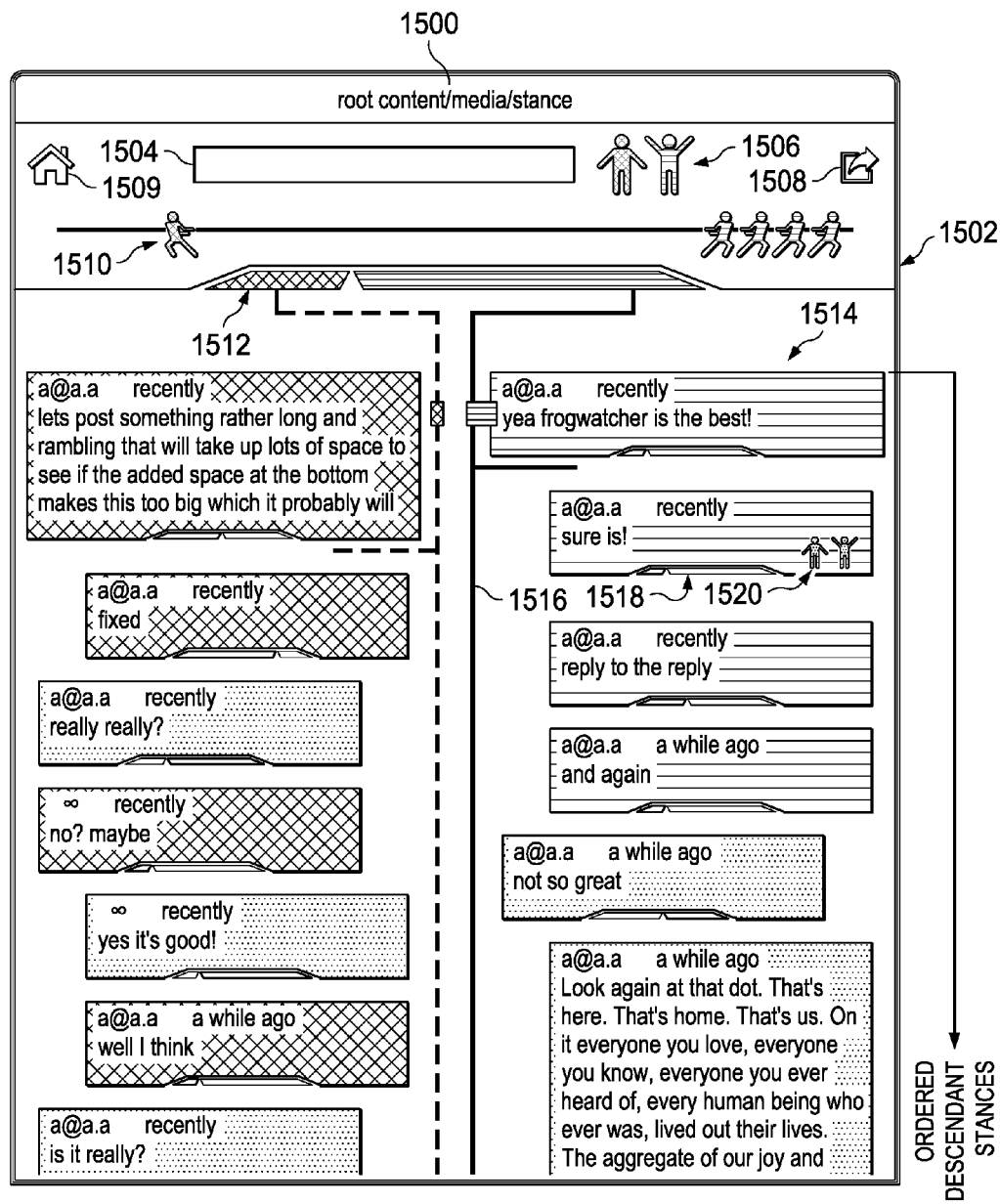
FIG. 15 illustrates a client machine user interface display by which an end user participates in a group discussion according to this disclosure.

FIG. 15 illustrates a typical end user interface for interacting with the system. Typically, this interface is a web page (or set of pages) exported from a server infrastructure such as shown in FIG. 1. A typical end user client machine has been described above. In this example interface, the root content stance 1500 is displayed above an interface panel 1502 that includes a data entry field 1504 that the user can use to create a new stance. The interface panel 1502 includes buttons 1506 to vote on and create different types of bridges to the root stance, as well as one or more buttons 1508 to enable other social networking features (e.g., sharing, following, tagging, e-mailing, pinging, and the like). Button 1509 provides navigation to more system controls and features. The tug meter 1510 underlies the interface panel 1502, and the kudos meter 1512 for the root stance underlies the tug meter. The main display panel 1514 is the multi-column display. As can be seen, preferably the posts are represented as ordered descendant stances. A visual representation 1516 of the stance and bridge structure may be provided, and individual stances my include a kudos meter 1518 for a descendant stance, as well as buttons 1520 to vote on and create different types of bridges to a descendant stance.

The multi-column display is a "conversation graph" that comprises a collection of data objects generated as a result of interactions initiated by a set of users. A particular user interacts with the conversation graph via an interface panel 1502 (or some other input mechanism). The data objects comprise at least a root stance, a set of one or more stances associated with the root stance, and one or more bridges, wherein a bridge represents a connection between two or more stances. Preferably, a stance is permitted to become part of the conversation graph only if information associated with given stance also represents one of: a vote with respect to a bridge, creation of a new bridge, and creation of a new bridge with a new stance. Thus, for example, a user can create a new bridge between existing stances, such as a scenario where a user reads two previously unconnected stances and enters the connection in the data field (e.g., "this corroborates the other, or these are related stances") and links them with the appropriate type of bridge (e.g., "agree" or "relate").

In this system, a vote is a data object, referring to the user having voted on a stance, and the kudos is added to by the voting, and the kudos propagates. Whereas votes are anchored to what was voted on, kudos accumulate and propagate across the conversation graph. Kudos propagation may be controlled by one or more system rules, which may be configurable, and kudos accumulate as this propagation occurs. Representative rules are the following: (1) positive kudos propagates; (2) if positive kudos go up a positive branch, it enters a positive side; and (3) if positive kudos go up a negative branch, it enters a negative side.

More generally, kudos may be any form of flexible currency that moves around by one or more configurable rules. In a further variant, kudos is added by other types of mechanisms besides voting. Kudos move around the system via one or more rules, and when kudos are placed on a positive (agree) side, it moves differently than when placed on a negative (disagree) side. In the example embodiment described, kudos do not propagate higher from a negative bucket.

In the described approach, bridges provide the mechanism for kudos to move on, and accumulated kudos and paths of kudos represent information about the network. Thus, for example, a first node may be deemed to be more important than another node because it (the first node) has more accumulated kudos, or what are important bridges (lots of kudos moving through).

More generally, kudos provides a game currency that is used as a mechanism to organize bridges and stances. Applying it to categories (like agree, or disagree) changes its behavior, and that behavior drives its circulation in the system by bubbling up the conversation graph following the bridges between stances, aggregating together so that bridges and kudos together provide more information value than either alone.

As noted above, the system may be provided as a service offering, available from a network presence such as a web site. Users of the system are associated with user accounts, which are informational entities comprising information entered by a user to contain their identity in the system, as well as information calculated or collected by the system relevant to that user and their actions. This information is stored in the system's data. Preferably, the system allows a single user account to maintain multiple user aliases, where a user alias is an identity in the system created by the user or the system and distinguished from other aliases or identities of the user but connected to their account. The user alias connection to the user account and/or other user aliases may be public or secret, and the system can maintain multiple aliases for any given account. Preferably, each user alias is connected to a user account. Preferably, stances and bridges that the user makes and interacts with are recorded as having interacted with the user alias so that all activity by an alias is traceable back to the account, but separate to all other aliases, even within the same account.

In one embodiment, the system described herein is implemented as a floating web application, wherein one of the client devices is a web browser (or mobile app) that creates an application connection into the system, e.g., on top of other viewed content in the browser. As is well-known, a browser may accept and process code into its address bar, links, bookmarks, browser plugins, browser apps, widgets, and other sources. To cause the system of stances and bridges to appear on top of web content inside the browser, given start code is executed as a browser-compatible program that adds a script tag to the current content with the address for a file on a server in the system containing more browser compatible code (the run code). When the start code is input into the browser by one or more of the methods mentioned above (or any other method of causing the device to process information), the browser processes it in standard accepted fashion, leading to it loading and processing the run code. The run code may also be run in the browser by other methods, e.g. by interaction by the user with browser compatible code. The run code browser or other client-compatible code creates a graphical user interface (such as shown in FIG. 15) on top of the existing web content. The run code also contains instructions needed to establish communication between the client device and the system to facilitate various interactions such as login, account access, information exchange, and so on. Client-server interactions may be implemented using known technologies, such HTMLs, CSS, scripts, AJAX, and the like.

Preferably, the system provides for automated progressive display of information. Thus, for example, the system starts with one piece of information chosen by some entity of the system (such as a user or process) and then generates and orders a list of further information based on parameters chosen by some entity of the system. Preferably, the system displays the first piece of information to the client device and, after an auto-timer by adjustable delay or input by an entity, displays the next piece of information in the list, and so on. The subsequent information may displace, replace, or otherwise affect the previous information in the display. This calculation of subsequent information to display could also occur dynamically (on-the-fly) rather than by generating a list at the outset. This variant is accomplished by having a play button in the system; when a user selects the play button, the system finds a stance based on user parameters and displays it to the user. The system then waits a user- or otherwise defined period of time and displays another stance, and so on. The selection of stances to display may be done by any configurable parameter, such as activity percentile, recent activity, creation-time of the stance, linking of the stance to other stances, or any other parameter.

The system provides significant advantages. It provides a method to determine how a collection of participants perceive given content. The system of stances (information containers), bridges, and kudos described herein provide a framework by which participants discuss, debate, vote on, connect, and compare media and other information. As has been described, when users use this system, they create a set of stances descending from a given root stance. The root stance contains some form of media, and the descendants contain the expressed thoughts of the one or more other participants viewing and commenting on the content. Preferably, participating users interact with the system by using a graphical interface to create and interact with stances, bridges, and kudos, thereby creating an information network. The system allows a user to connect stances together while noting a type of connection, such as positive or negative, while assigning kudos, a currency moving throughout the system. Thus, when a user interacts with the system, the system in effect receives and stores a measure of the user's thoughts about given content in question. When a user creates a stance and connects it to another stance, the system then has data that effectively represents how the user thinks about that content. When many users use the system, presumably the more popular thoughts of the users gain the most kudos, and the system thus in effect "learns" what the population of users most thought about the content (the content of the stances) and how it relates to the content (the type of bridge). Moreover, the system also learns what is thought second most, and so on, because preferably all stances accrue kudos according to user interaction.

In this manner, the system creates, organizes, and prioritizes the thoughts and consensuses of a group of users in relation to given content. Thus, while the system may not have information about what is contained in a particular news article, it "knows" what users think about the article and how those thoughts relate to each other. The system displays this information to the client devices through its graphical representation and ordering of stances, bridges, and kudos, as has been described.

By providing the system "as-a-service," any number of participants may interact with any content, thereby creating a plurality of information networks available from the system using conventional network-based interactions.

Particular information networks may be secured, and individual participants to that network (and thus the conversation) may be controlled or circumscribed. The system provides an infrastructure by which numerous conversations can take place concurrently in secure silos accessible only to permitted (e.g., invited) individuals. There may be a moderator for each conversation, and known security mechanisms (e.g., single-sign-on, and the like) may be used to enforce privacy around a particular conversation graph.

While the above description sets forth a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computing entity selectively activated or reconfigured by a stored computer program stored. Such a computer program may be stored in a computer readable storage medium, such as, but is not limited to, any type of disk including an optical disk, a CD-ROM, and a magnetic-optical disk, flash memory, a read-only memory (ROM), a random access memory (RAM), a magnetic or optical card, or any type of non-transitory media suitable for storing electronic instructions.

While given components of the system have been described separately, one of ordinary skill will appreciate that some of the functions may be combined or shared in given instructions, program sequences, code portions, and the like.

The technique described herein may be implemented by any entity within any information technology ecosystem including, for example, web sites and portals, exchanges, content distribution networks, enterprise systems, and the like.

Having described my invention, what I now claim is as follows.

What is claimed is:

1. A method, operative at a network-accessible entity, for evaluating a degree of consensus among a set of users using a currency value having at least first and second categories, the method comprising:

outputting, using software executing on a hardware element, a conversation graph as a collection of data objects generated as a result of interactions initiated by the set of users, the data objects comprising at least a root stance, a set of one or more stances associated with the root stance, and one or more bridges, wherein a bridge represents a connection between two or more stances, and wherein a given stance is permitted to become part of the conversation graph only if information associated with given stance also represents one of: a vote with respect to a bridge, creation of a new bridge, and creation of a new bridge with a new stance;

associating a unit of the currency value with a vote on a stance; and propagating, using software executing on a hardware element, the currency values up to the root stance for one or more stances in the conversation graph that are linked to one another to provide an indication of a consensus with respect to a given stance.

2. The method as described in claim 1 wherein the first category is a positive indication indicating an agreement, and the second category is a negative indication indicating a disagreement.

3. The method as described in claim 2 wherein, for a particular stance in the conversation graph, propagating comprises accumulating votes in the first category using a sum of currency value units assigned to all of the descendants of the particular stance.

4. The method as described in claim 3 wherein a stance with no descendants has currency value units in the first category equal to a number of votes in the first category.

5. The method as described in claim 2 wherein, for a stance that is negatively-linked, propagating includes combining the currency value units of the first and second categories.

6. The method as described in claim 5 wherein combining current value units comprises adding positive currency value units of the negatively-linked stance to the negative currency value units of a parent stance.

7. The method as described in claim 1 wherein the conversation graph is output in a multi-column display format wherein, at each stance, one or more stances related by a first type of bridge are displayed in a first column, and one or more stances related by a second type of bridge are displayed in a second column.

8. The method as described in claim 7 further including adjusting the multi-column display format by interleaving stances and providing a visual distinction that a particular stance is associated with a particular side of a discussion thread.

9. The method as described in claim 7 further including:
responsive to selection of a particular stance, highlighting one or more stances and bridges that are connected to the particular stance to distinguish the highlighted stances and bridges from other portions of the conversation graph.

10. The method as described in claim 7 further including applying a visual format to one or more stances to distinguish the one or more stances from other portions of the conversation graph.

11. The method as described in claim 1 further including displaying a visualization representing, with respect to a particular stance, a relative number of votes in the conversation graph with respect to the first and second categories.

12. The method as described in claim 1 further including displaying a visualization representing, with respect to the conversation graph, a relative number of currency unit values in the conversation graph with respect to the first and second categories.

13. The method as described in claim 1 further including displaying a visualization of the stances as a network of nodes.

14. The method as described in claim 13 further including: selecting a particular node from the network of nodes; and displaying a secondary visualization illustrating one or more nodes in tension with the particular node, together with an indication of a degree of tension.

15. The method as described in claim 1 further including: associating a strength value with a particular bridge in the conversation graph, the strength value being a function of at least the currency values associated with the particular bridge.

16. The method as described in claim 15 wherein the strength value also is a function of an activity level associated with the particular bridge.

17. An apparatus, comprising:
a network-accessible infrastructure operating at a service provider domain, the network-accessible infrastructure comprising at least one web server providing to each of a set of participating users a web page displaying a root stance, a data entry field to receive input data representing a new stance, and a display field to display a multi-column conversation graph including stances input to the network-accessible infrastructure by participating end users, where a participating end user operates a machine that can access the infrastructure and that includes a browser or other rendering engine;
a service application instance executing in the network-accessible infrastructure to generate the conversation graph as a collection of data objects generated as a result of interactions initiated by the set of users via the web page, the data objects comprising at least a root stance, a set of one or more stances associated with the root stance, and one or more bridges, wherein a bridge represents a connection between two or more stances, and wherein a given stance is permitted to become part of the conversation graph only if information associated with given stance also represents one of: a vote with respect to a bridge, creation of a new bridge, and creation of a new bridge with a new stance, wherein a vote by a participating end user associated with a stance is associated with a unit of a currency value;
the service application maintaining a database on information that includes the votes and the currency value units;
the service application propagating the currency values up to the root stance for one or more stances in the conversation graph that are linked to one another to provide an indication of a consensus with respect to a given stance.

* * * * *